United States Patent
Tsai et al.

(10) Patent No.: US 11,221,719 B2
(45) Date of Patent: Jan. 11, 2022

(54) SENSOR PATTERN AND CAPACITIVE TOUCH SCREEN

(71) Applicant: HIMAX TECHNOLOGIES LIMITED, Tainan (TW)

(72) Inventors: Cheng-Hung Tsai, Tainan (TW); Ying-Zhuan Liu, Tainan (TW); Yuan-Ting Chen, Tainan (TW); Chin-Yuan Chiang, Tainan (TW); Jui-Ni Li, Tainan (TW); Wai Pan Wu, Tainan (TW); Shen-Feng Tai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 47 days.

(21) Appl. No.: 16/049,695

(22) Filed: Jul. 30, 2018

(65) Prior Publication Data
US 2019/0042024 A1 Feb. 7, 2019

Related U.S. Application Data

(60) Provisional application No. 62/539,561, filed on Aug. 1, 2017.

(51) Int. Cl.
*G06F 3/044* (2006.01)
*G06F 3/041* (2006.01)

(52) U.S. Cl.
CPC .......... *G06F 3/0446* (2019.05); *G06F 3/0445* (2019.05); *G06F 3/04164* (2019.05);
(Continued)

(58) Field of Classification Search
CPC .......... G06F 3/044; G06F 2203/04107; G06F 2203/04111
See application file for complete search history.

(56) References Cited

U.S. PATENT DOCUMENTS

9,891,745 B2 * 2/2018 Lee ..................... G06F 3/04164
10,055,069 B2 * 8/2018 Lee ................... G02F 1/133514
(Continued)

FOREIGN PATENT DOCUMENTS

| CN | 202453850 U | 9/2012 |
|---|---|---|
| CN | 103246406 A | 8/2013 |

(Continued)

*Primary Examiner* — Patrick N Edouard
*Assistant Examiner* — Eboni N Giles
(74) *Attorney, Agent, or Firm* — Winston Hsu

(57) ABSTRACT

A sensor pattern and a capacitive touch screen are provided. The sensor pattern comprises: a plurality of unit blocks, and a first unit block of the unit blocks comprises: a first 1st-type sensor element, a first 2nd-type sensor element, and a second 2nd-type sensor element. The first 1st-type sensor element is disposed on a first patterned layer, having a border trace, two parallel main traces, a bridge, a first cell, and a second cell, wherein the first and second cells are not aligned. The first 2nd-type sensor element is disposed on a second patterned layer, having a main trace and a sub-trace, wherein the main trace surrounds the first cell of the first 1st-type sensor element. The second 2nd-type sensor element is disposed on the second patterned layer, having a main trace and a sub-trace, wherein the main trace surrounds the second cell of the first 1st-type sensor element.

20 Claims, 9 Drawing Sheets

(52) U.S. Cl.
CPC .............. *G06F 2203/04107* (2013.01); *G06F 2203/04111* (2013.01)

(56) References Cited

U.S. PATENT DOCUMENTS

| | | | | |
|---|---|---|---|---|
| 2010/0302201 | A1* | 12/2010 | Ritter | G06F 3/0446 345/174 |
| 2012/0133611 | A1* | 5/2012 | Chai | H03K 17/9622 345/174 |
| 2013/0305168 | A1 | 11/2013 | Murata | |
| 2014/0022202 | A1* | 1/2014 | Badaye | G06F 3/0448 345/174 |
| 2015/0349773 | A1* | 12/2015 | Gourevitch | G06F 3/0446 200/5 R |
| 2016/0109741 | A1* | 4/2016 | Lee | G06F 3/04184 349/12 |
| 2017/0017347 | A1* | 1/2017 | Wilson | G06F 3/0446 |

FOREIGN PATENT DOCUMENTS

| | | |
|---|---|---|
| CN | 103913873 A | 7/2014 |
| CN | 103927061 A | 7/2014 |
| CN | 104461207 A | 3/2015 |
| CN | 105446566 A | 3/2016 |
| CN | 105760033 A | 7/2016 |
| CN | 106547413 A | 3/2017 |
| CN | 106775145 A | 5/2017 |
| CN | 106796475 A | 5/2017 |
| TW | 201523402 A | 6/2015 |

\* cited by examiner

SENSOR PATTERN AND CAPACITIVE TOUCH SCREEN

CROSS REFERENCE TO RELATED APPLICATIONS

This application claims the benefit of U.S. Provisional Application No. 62/539,561, filed on Aug. 1, 2017 and included herein by reference.

BACKGROUND OF THE INVENTION

1. Field of the Invention

The present invention relates to a sensor pattern and a capacitive touch screen, and more particularly, to a sensor pattern and a capacitive touch screen capable of simplifying border channel topology to reduce border trace area in a touch screen of an electronic device.

2. Description of the Prior Art

In general, the border trace of a capacitive touch panel (TP) (e.g. a Glass Film Film (GFF) TP) is Ag print, and the active area of the capacitive TP comprises Indium Tin Oxide (ITO) traces. The connection between the different metal materials needs a contact scheme which requires more border area. Please refer to FIG. 1 and FIG. 2. FIG. 1 is a top view diagram illustrating a transmit (TX)/receive (RX) channel routing of a conventional capacitive TP 100, wherein the conventional capacitive TP 100 can be a 5.5 inch TP for a smartphone, and FIG. 2 is a simplified block diagram illustrating a pattern 110 and TX/RX mapping of the conventional capacitive TP 100 in FIG. 1. The conventional capacitive touch panel 100 comprises 26 TX channels TX1~TX26, 15 RX and channels RX1~RX15, and the pattern 110 comprises 390 unit blocks 120. Each TX channel comprises 15 TX sensor elements, and each RX channel comprises 26 RX sensor elements. Each unit block 120 comprises one TX sensor element and one RX sensor element. For example, in the left side of the conventional capacitive TP 100, since there are 26 TX sensor elements having a border trace, there are 26 border traces. Thus, the conventional capacitive TP 100 requires a larger border area. In prior art, the capacitive TP manufacturers have to upgrade higher level manufacturing equipment to improve width and space of the Ag print, so as to simplify the border area for the capacitive TP application which requires slim border. However, this solution increases the cost a lot.

SUMMARY OF THE INVENTION

It is therefore one of the objectives of the present invention to provide a sensor pattern and a capacitive touch screen capable of simplifying border channel topology to reduce border trace area in a touch screen of an electronic device, so as to solve the above problem.

In accordance with an embodiment of the present invention, a sensor pattern for a capacitive touch screen is disclosed. The sensor pattern comprises: a plurality of unit blocks, and a first unit block of the unit blocks comprises: a first 1st-type sensor element, a first 2nd-type sensor element, and a second 2nd-type sensor element. The first 1st-type sensor element is disposed on a first patterned layer, having a border trace, two parallel main traces, a bridge, a first cell, and a second cell, wherein the first cell and the second cell are not aligned. The bridge is utilized for connecting the first cell and the second cell of the first 1st-type sensor element. The first 2nd-type sensor element is disposed on a second patterned layer, having a main trace and a sub-trace, wherein the main trace surrounds the first cell of the first 1st-type sensor element. The second 2nd-type sensor element is disposed on the second patterned layer, having a main trace and a sub-trace, wherein the main trace surrounds the second cell of the first 1st-type sensor element.

In accordance with an embodiment of the present invention, a capacitive touch screen is disclosed. The capacitive touch screen comprises a sensor pattern, and the sensor pattern comprises a plurality of unit blocks. A first unit block of the unit blocks comprises: a first 1st-type sensor element, a first 2nd-type sensor element, and a second 2nd-type sensor element. The first 1st-type sensor element is disposed on a first patterned layer, having a border trace, two parallel main traces, a bridge, a first cell, and a second cell, wherein the first cell and the second cell are not aligned. The bridge is utilized for connecting the first cell and the second cell of the first 1st-type sensor element. The first 2nd-type sensor element is disposed on a second patterned layer, having a main trace and a sub-trace, wherein the main trace surrounds the first cell of the first 1st-type sensor element. The second 2nd-type sensor element is disposed on the second patterned layer, having a main trace and a sub-trace, wherein the main trace surrounds the second cell of the first 1st-type sensor element.

Briefly summarized, the sensor pattern and the capacitive touch screen disclosed by the present invention are capable of simplifying border channel topology to reduce border trace area in a touch screen of an electronic device such as a smartphone. The slim border Glass-Film-Film (GFF) touch performance optimization can be based on the presented sensor pattern, related IC, and specified algorithm tuning.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
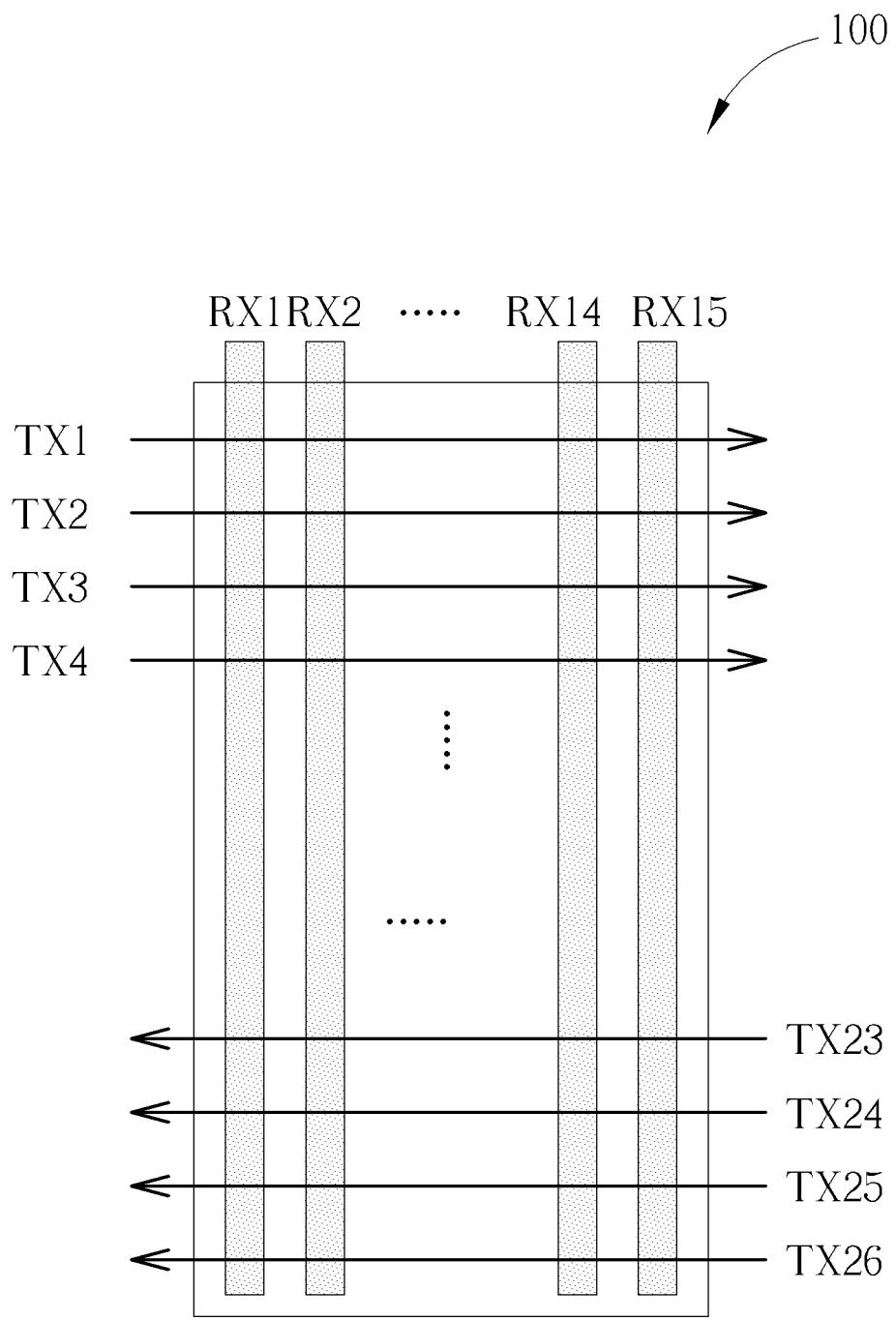
FIG. 1 is a top view diagram illustrating a transmit (TX)/receive (RX) channel routing of a conventional capacitive TP.
Figure 2:
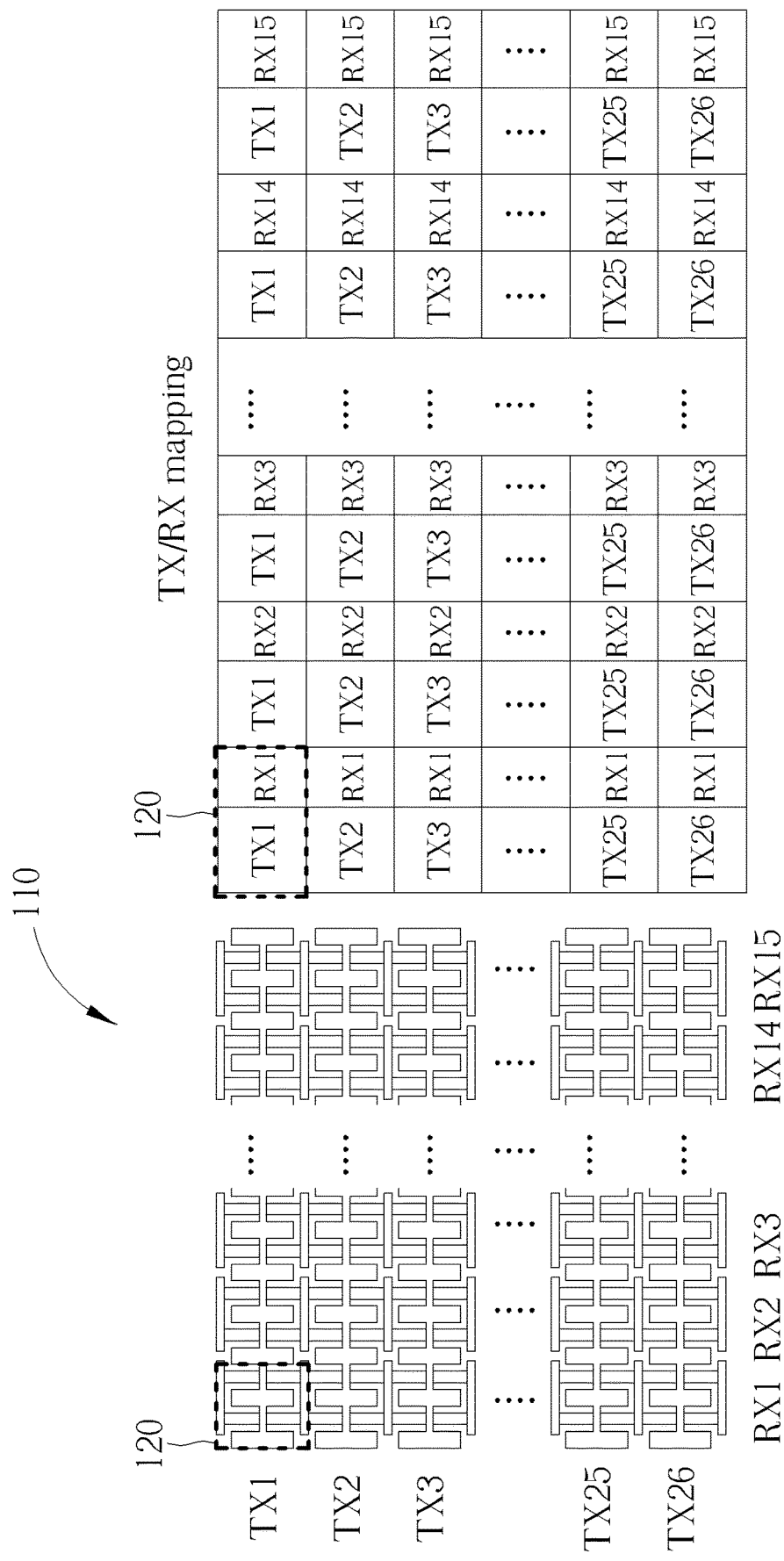
FIG. 2 is a simplified block diagram illustrating a pattern and TX/RX mapping of the conventional capacitive TP in FIG. 1.
Figure 3:
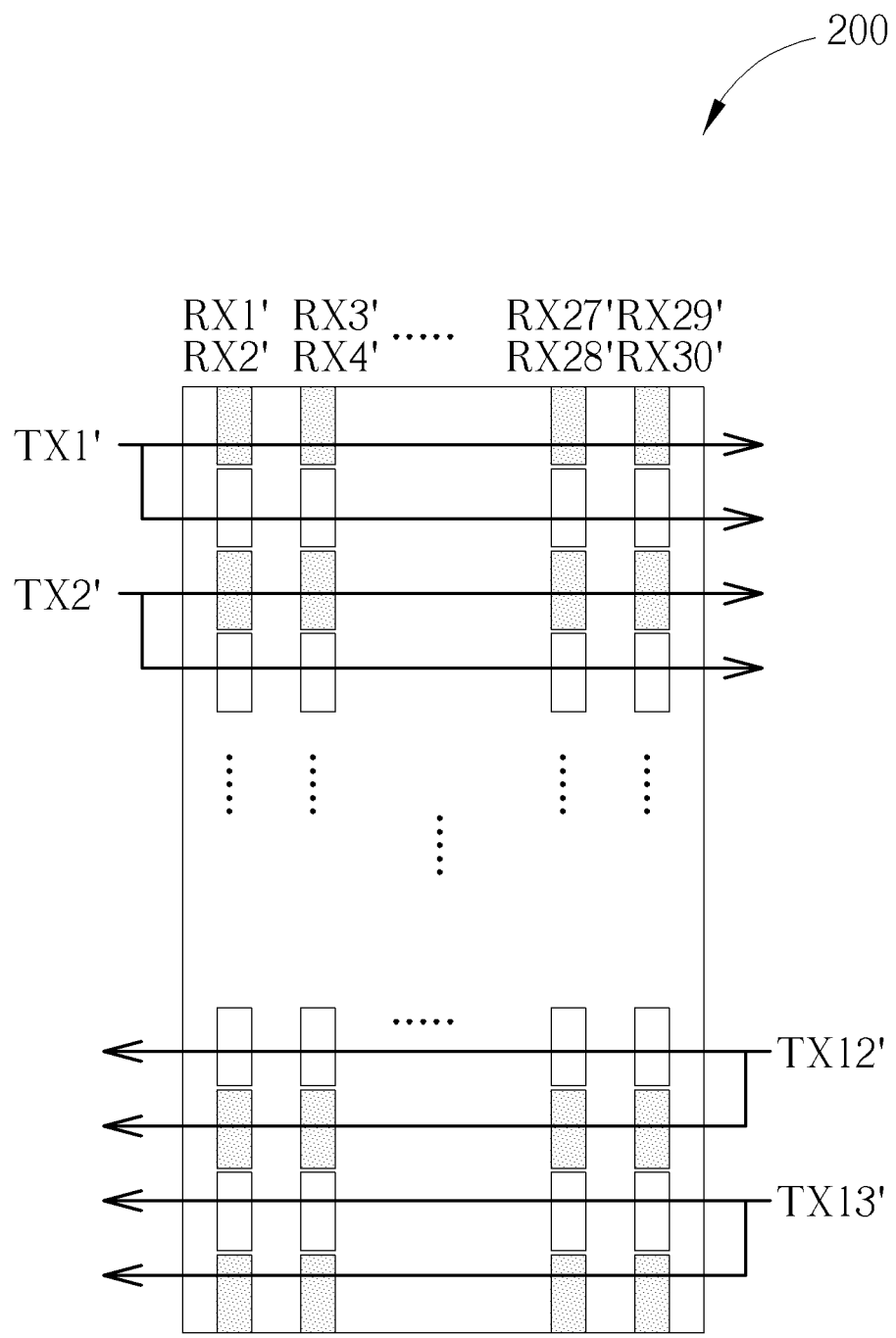
FIG. 3 is a top view diagram illustrating a transmit (TX)/receive (RX) channel routing of a capacitive touch screen in accordance with a first embodiment of the present invention.
Figure 4:
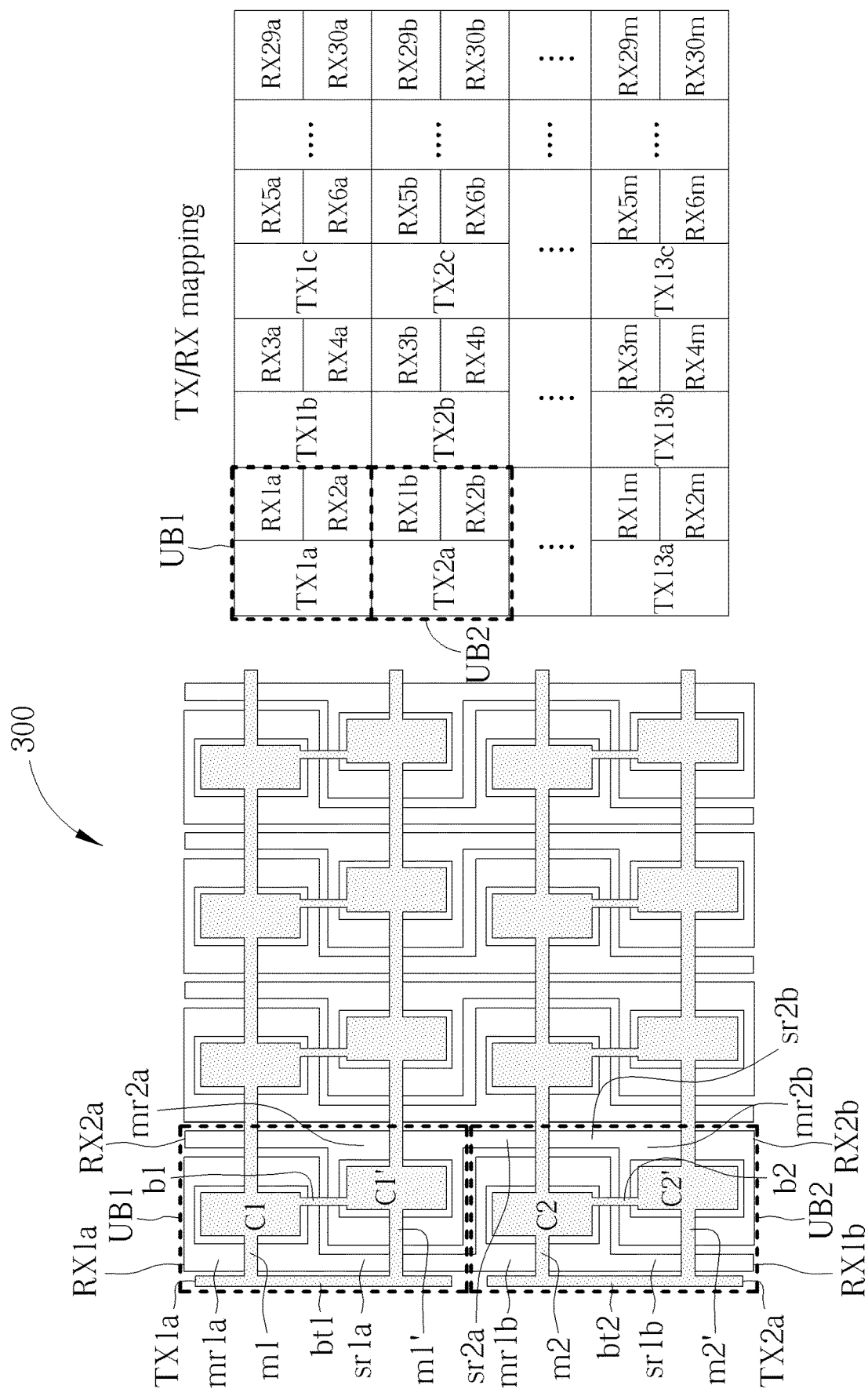
FIG. 4 is a simplified block diagram illustrating a sensor pattern and TX/RX mapping of the capacitive touch screen in FIG. 3.

Please refer to FIG. 3 and FIG. 4. FIG. 3 is a top view diagram illustrating a transmit (TX)/receive (RX) channel routing of a capacitive touch screen 200 in accordance with a first embodiment of the present invention, wherein the capacitive touch screen 200 can be a 5.5 inch touch screen for a smartphone, and FIG. 4 is a simplified block diagram illustrating a sensor pattern 300 and TX/RX mapping of the capacitive touch screen 200 in FIG. 3. The capacitive touch screen 200 comprises 13 TX channels TX1'-TX13' and 30 RX channels RX1'-RX30', and the sensor pattern 300 comprises 195 unit blocks UB1~195. Each TX channel comprises 15 TX sensor elements, and each RX channel comprises 13 RX sensor elements. Each unit block of the unit blocks UB1~195 comprises one TX sensor element and two RX sensor elements. For example, in the left side of the capacitive touch screen 200, since there are only 13 TX sensor elements having a border trace, there are only 13 border traces. Thus, the capacitive touch screen 200 requires a smaller border area compared to the conventional capacitive TP 100. In other words, when the conventional capacitive TP 100 has a number X of TX channels and a number Y of RX channels, the present invention can provide the capacitive touch screen 200 having a number X/2 of TX channels and a number 2*Y of RX channels by using a parallel scheme in the TX pattern and using an alternating scheme in the RX pattern (as shown in FIG. 3), so as to simplify the border area and reduce the required border trace area.

For example, a unit block UB1 comprises: a first TX sensor element TX1$a$, a first RX sensor element RX1$a$, and a second RX sensor element RX2$a$. The first TX sensor element TX1$a$ is disposed on a first patterned layer, and has a border trace bt1, two parallel main traces m1, m1', a bridge b1, a first cell c1, and a second cell c1', wherein the first cell c1 and the second cell c1' are not aligned so as to improve touch sensing quality. The bridge b1 is utilized for connecting the first cell c1 and the second cell c1' of the first TX sensor element TX1$a$. The first RX sensor element RX1$a$ is disposed on a second patterned layer, and has a main trace mr1$a$ and a sub-trace sr1$a$, wherein the main trace mr1$a$ surrounds the first cell c1 of the first TX sensor element TX1$a$. The second RX sensor element RX2$a$ is disposed on the second patterned layer, having a main trace mr2$a$ and a sub-trace sr2$a$, wherein the main trace mr2$a$ surrounds the second cell c1' of the first TX sensor element TX1$a$. A unit block UB2 comprises: a second TX sensor element TX2$a$, a third RX sensor element RX1$b$, and a fourth RX sensor element RX2$b$. The second TX sensor element TX2$a$ is disposed on a first patterned layer, and has a border trace bt2, two parallel main traces m2, m2', a bridge b2, a first cell c2, and a second cell c2', wherein the first cell c2 and the second cell c2' are not aligned so as to improve touch sensing quality. The bridge b2 is utilized for connecting the first cell c2 and the second cell c2' of the second TX sensor element TX2$a$. The third RX sensor element RX1$b$ is disposed on a second patterned layer, and has a main trace mr1$b$ and a sub-trace sr1$b$, wherein the main trace mr1$b$ surrounds the first cell c2 of the second TX sensor element TX2$a$, and the sub-trace sr1$b$ is coupled to the first RX sensor element RX1$a$ of the unit block UB1. The fourth RX sensor element RX2$b$ is disposed on the second patterned layer, having a main trace mr2$b$ and a sub-trace sr2$b$, wherein the main trace mr2$b$ surrounds the second cell c2' of the second TX sensor element TX2$a$ and the sub-trace sr2$b$ is coupled to the second RX sensor element RX2$a$ of the unit block UB1. In addition, the first cell c1 of the first TX sensor element TX1$a$ and the first cell c2 of the second TX sensor element TX2$a$ are aligned, and the second cell of c1' the first TX sensor element TX1$a$ and the second cell c2' of the second TX sensor element TX2$a$ are aligned. Please note that the above embodiment is merely for an illustrative purpose and is not meant to be a limitation of the present invention. For example, the number of TX sensor elements in the TX channel and the number of RX sensor elements in the RX channel can be changed according to different design requirements. In other embodiments, the positions of the TX channels and the RX channels can be swapped.

Figure 5:
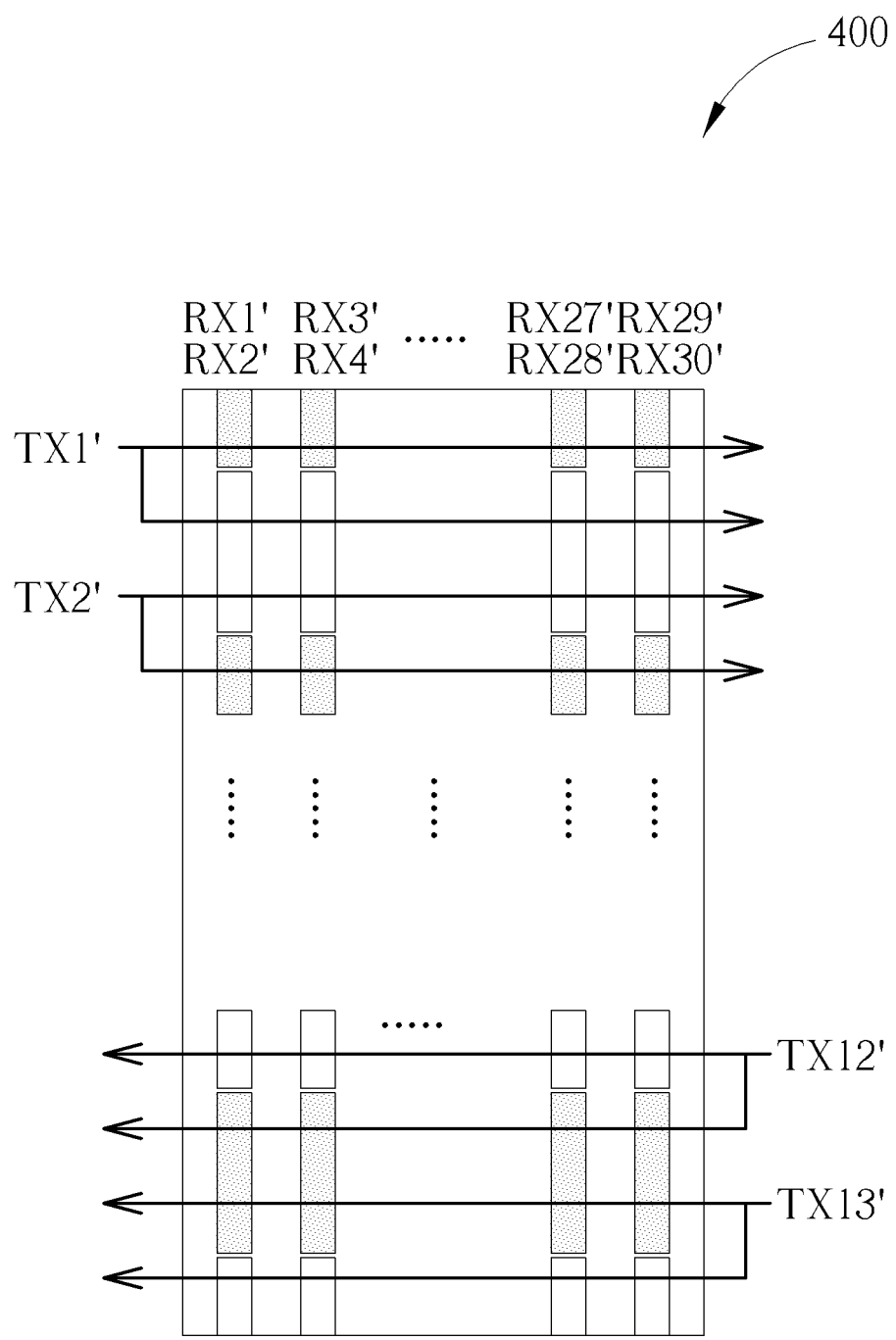
FIG. 5 is a top view diagram illustrating a transmit (TX)/receive (RX) channel routing of a capacitive touch screen in accordance with a second embodiment of the present invention.
Figure 6:
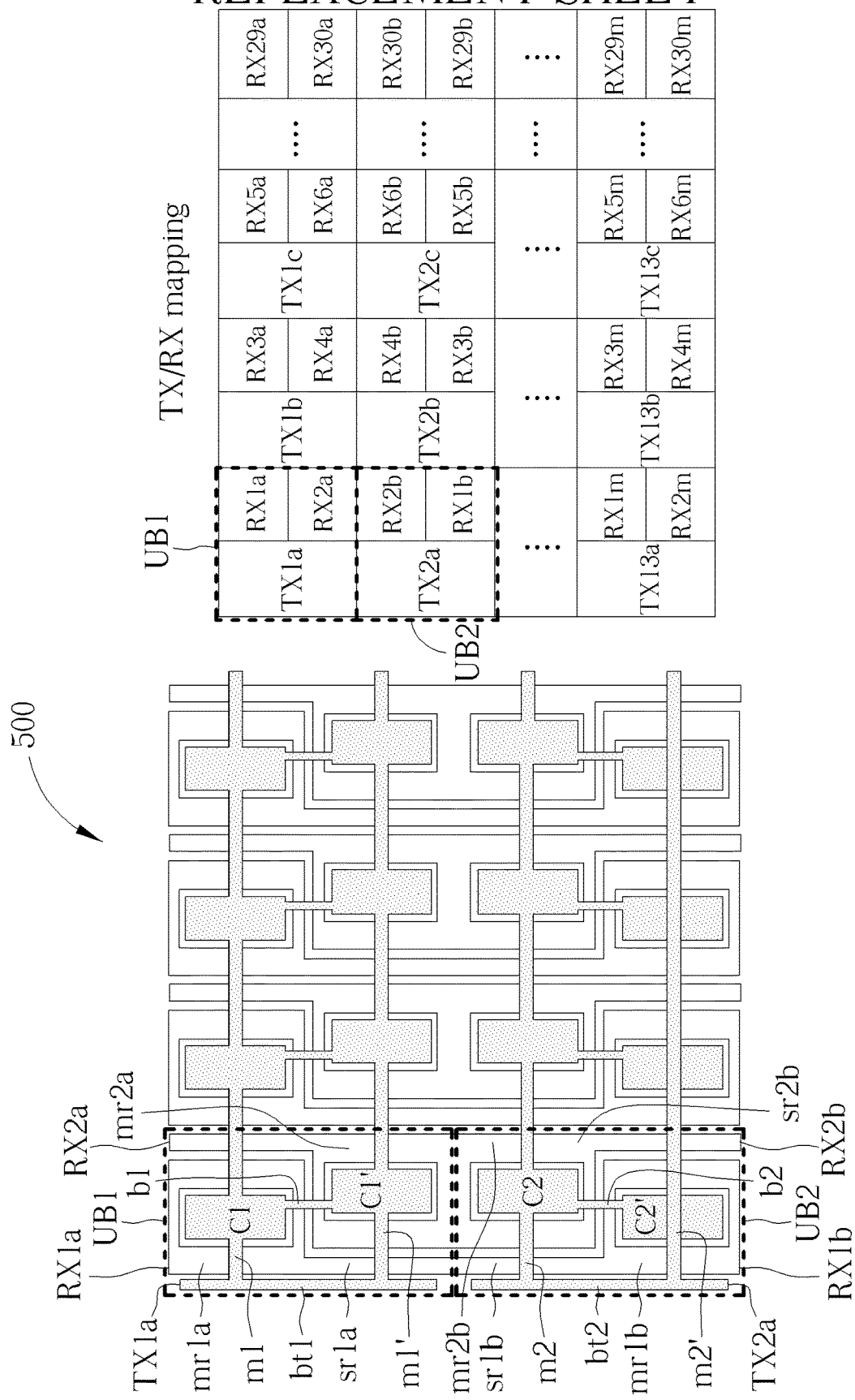
FIG. 6 is a simplified block diagram illustrating a sensor pattern and TX/RX mapping of the capacitive touch screen in FIG. 5.

Please refer to FIG. 5 and FIG. 6. FIG. 5 is a top view diagram illustrating a transmit (TX)/receive (RX) channel routing of a capacitive touch screen 400 in accordance with a second embodiment of the present invention, wherein the capacitive touch screen 400 can be a 5.5 inch touch screen for a smartphone, and FIG. 6 is a simplified block diagram illustrating a sensor pattern 500 and TX/RX mapping of the capacitive touch screen 400 in FIG. 5. The capacitive touch screen 400 comprises 13 TX channels TX1'~TX13' and 30 RX channels RX1'~RX30', and the sensor pattern 500 comprises 195 unit blocks UB1~195. Each TX channel comprises 15 TX sensor elements, and each RX channel comprises 13 RX sensor elements. Each unit block of the unit blocks UB1~195 comprises one TX sensor element and two RX sensor elements. For example, in the left side of the capacitive touch screen 400, since there are only 13 TX sensor elements having a border trace, there are only 13 border traces. Thus, the capacitive touch screen 400 requires a smaller border area compared to the conventional capacitive TP 100. In other words, when the conventional capacitive TP 100 has a number X of TX channels and a number Y of RX channels, the present invention can provide the capacitive touch screen 400 having a number X/2 of TX channels and a number 2*Y of RX channels by using a parallel scheme in the TX pattern and using an alternating scheme in the RX pattern (as shown in FIG. 5), so as to simplify the border area and reduce the required border trace area.

Figure 10:
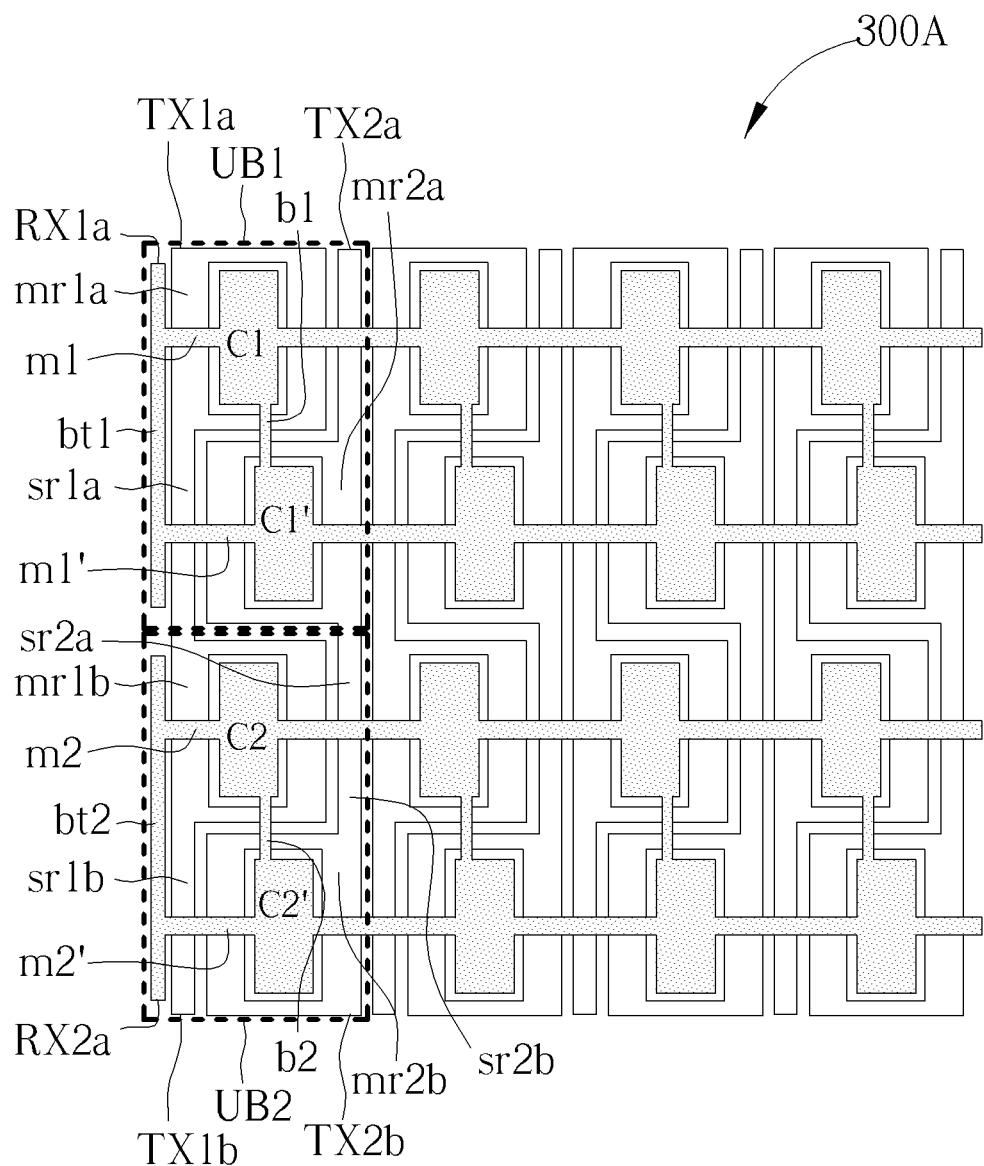
FIG. 10 is a diagram illustrating another sensor pattern according to an embodiment of the present invention.

For example, a unit block UB1 comprises: a first TX sensor element TX1$a$, a first RX sensor element RX1$a$, and a second RX sensor element RX2$a$. The first TX sensor element TX1$a$ is disposed on a first patterned layer, and has a border trace bt1, two parallel main traces m1, m1', a bridge b1, a first cell c1, and a second cell c1', wherein the first cell c1 and the second cell c1' are not aligned so as to improve touch sensing quality. The bridge b1 is utilized for connecting the first cell c1 and the second cell c1 ' of the first TX sensor element TX1$a$. The first RX sensor element RX1$a$ is disposed on a second patterned layer, and has a main trace mr1$a$ and a sub-trace sr1$a$, wherein the main trace mr1$a$ surrounds the first cell c1 of the first TX sensor element TX1$a$. The second RX sensor element RX2$a$ is disposed on the second patterned layer, having a main trace mr2$a$ and a sub-trace sr2$a$, wherein the main trace mr2$a$ surrounds the second cell c1' of the first TX sensor element TX1$a$. A unit block UB2 comprises: a second TX sensor element TX2$a$, a third RX sensor element RX1$b$, and a fourth RX sensor element RX2$b$. The second TX sensor element TX2$a$ is disposed on a first patterned layer, and has a border trace bt2, two parallel main traces m2, m2', a bridge b2, a first cell c2, and a second cell c2', wherein the first cell c2 and the second cell c2' are not aligned so as to improve touch sensing quality. The bridge b2 is utilized for connecting the first cell c2 and the second cell c2' of the second TX sensor element TX2$a$. The third RX sensor element RX1$b$ is disposed on a second patterned layer, and has a main trace mr1$b$ and a sub-trace sr1$b$, wherein the main trace mr1$b$ surrounds the second cell c2' of the second TX sensor element TX2$a$, and the sub-trace sr1$b$ is coupled to the first RX sensor element RX1$a$ of the unit block UB1. The fourth RX sensor element RX2$b$ is disposed on the second patterned layer, having a main trace mr2$b$ and a sub-trace sr2$b$, wherein the main trace mr2$b$ surrounds the first cell c2 of the second TX sensor element TX2$a$ and directly connected to the second RX sensor element RX2$a$ of the unit block UB1. In addition, the first cell c1of the first TX sensor element TX1$a$ and the second cell c2' of the second TX sensor element TX2$a$ are aligned, and the second cell of c1' the first TX sensor element TX1$a$ and the first cell c2 of the second TX sensor element TX2$a$ are aligned. Please note that the above embodiment is merely for an illustrative purpose and is not meant to be a limitation of the present invention. For example, the number of TX sensor elements in the TX channel and the number of RX sensor elements in the RX channel can be changed according to different design requirements. In other embodiments, the positions of the TX channels and the RX channels can be swapped. For example, FIG. 10 is a diagram illustrating a sensor pattern 300A, where the first TX sensor element TX1$a$ and the second TX sensor element TX2$a$ shown in FIG. 4 are replaced with RX sensor elements (e.g. RX1$a$ and RX2$a$), and the first RX sensor element RX1$a$, the second RX sensor element RX2$a$, the third RX sensor element RX1$b$ and the fourth RX sensor element RX2$b$ shown in FIG. 4 are replaced with TX sensor elements (e.g. TX1$a$, TX2$a$, TX1$b$ and TX2$b$).

Figure 7:
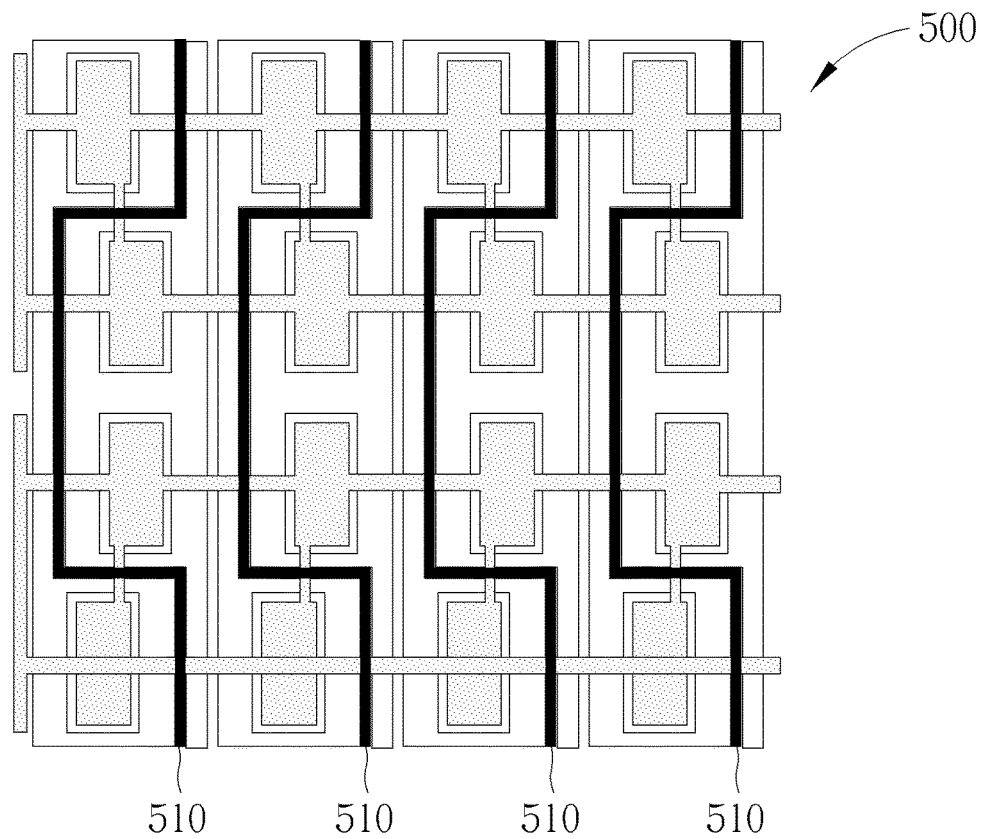
FIG. 7 is a simplified block diagram illustrating a sensor pattern of the capacitive touch screen in FIG. 5 comprising one type of shielding layer.
Figure 8:
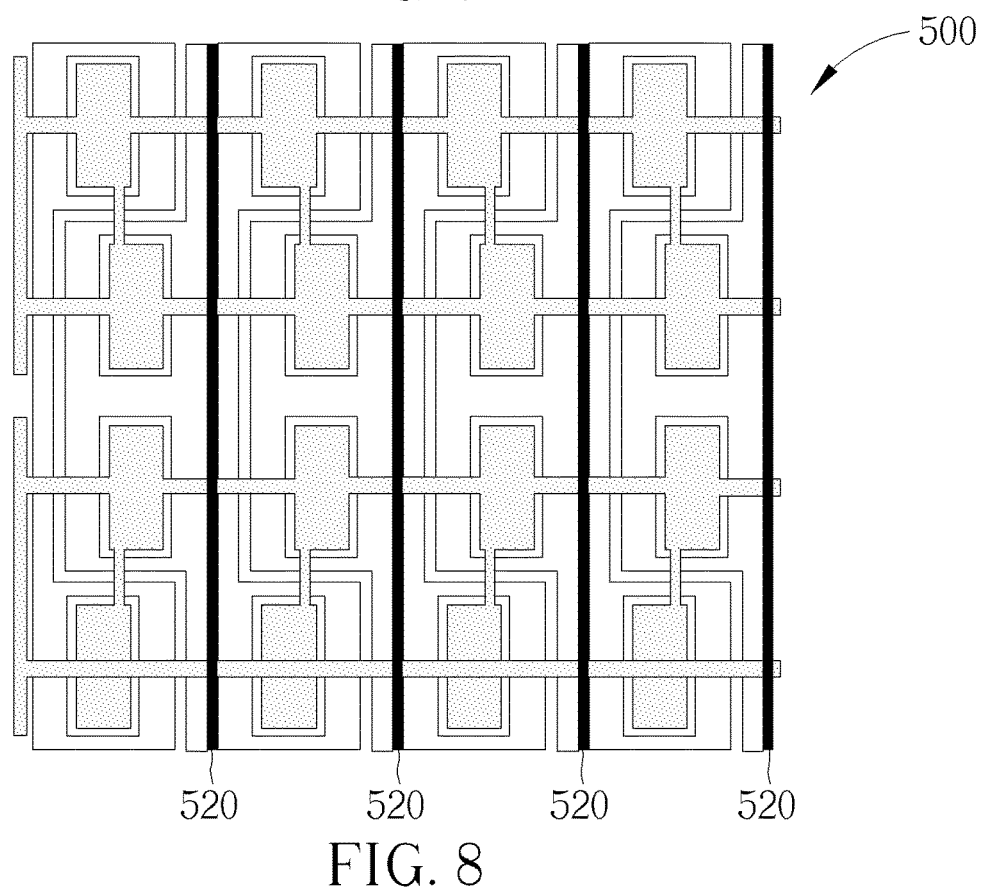
FIG. 8 is a simplified block diagram illustrating a sensor pattern of the capacitive touch screen in FIG. 5 comprising another type of shielding layer.
Figure 9:
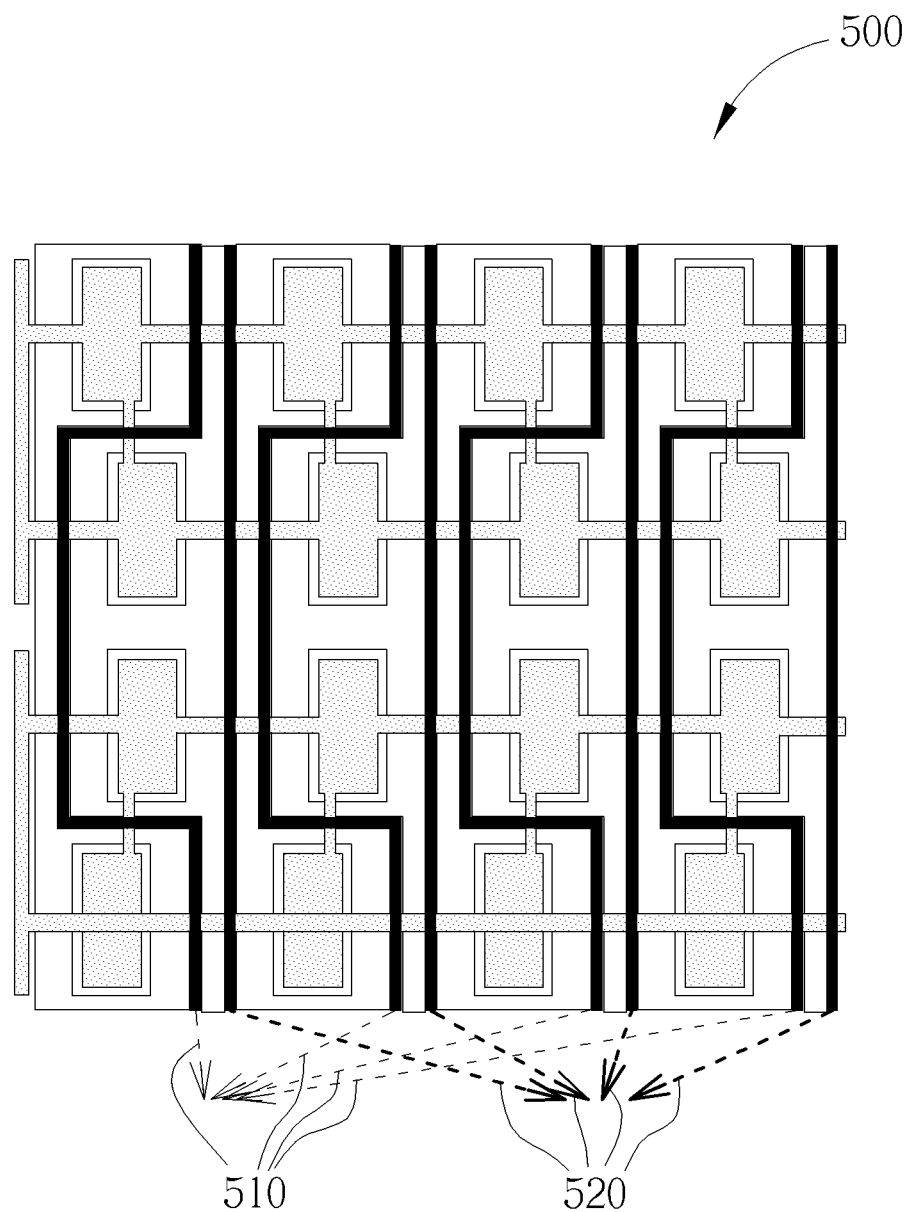
FIG. 9 is a simplified block diagram illustrating a sensor pattern of the capacitive touch screen in FIG. 5 comprising two types of shielding layers.

In addition, in another embodiment, the sensor pattern 500 can further comprise a shielding layer 510 as shown in FIG. 7 so as to improve touch sensing quality. The shielding layer 510 is disposed between the first RX sensor element RX1$a$ and the second RX sensor element RX2$a$ and disposed between the third RX sensor element RX1$b$ and the fourth RX sensor element RX2$b$. In one another embodiment, the sensor pattern 500 can further comprise a shielding layer 520 as shown in FIG. 8 so as to improve touch sensing quality. The shielding layer 520 is disposed between the unit blocks (or the sensor elements) in different columns. Moreover, the sensor pattern 500 also can further comprise both the shielding layer 510 and the shielding layer 520 as shown in FIG. 9 so as to improve touch sensing quality.

Briefly summarized, the sensor pattern and the capacitive touch screen disclosed by the present invention are capable of simplifying border channel topology to reduce border trace area in a touch screen of an electronic device such as a smartphone. The slim border Glass-Film-Film (GFF) touch performance optimization can be based on the presented sensor pattern, related IC, and specified algorithm tuning.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensor pattern for a capacitive touch screen, comprising:
   a plurality of unit blocks, a first unit block of the unit blocks comprising:
      a first $1^{st}$-type sensor element, belonging to a first $1^{st}$-type channel, disposed on a first patterned layer, coupled to a border trace, having a bridge, a first cell, and a second cell, wherein the first cell and the second cell are not aligned, and the bridge is utilized for connecting the first cell and the second cell of the first $1^{st}$-type sensor element;
      a first $2^{nd}$-type sensor element, belonging to a first $2^{nd}$-type channel, disposed on a second patterned layer, having a main trace and a sub-trace, wherein the main trace of the first $2^{nd}$-type sensor element surrounds the first cell of the first $1^{st}$-type sensor element; and
      a second $2^{nd}$-type sensor element, belonging to a second $2^{nd}$-type channel different from the first $2^{nd}$-type channel, disposed on the second patterned layer, having a main trace and a sub-trace, wherein the main trace of the second $2^{nd}$-type sensor element surrounds the second cell of the first $1^{st}$-type sensor element;
   wherein the unit blocks further comprise another first unit block which has a same architecture as the first unit block, the first cell and the second cell of the first $1^{st}$-type sensor element of the first unit block are connected to a first cell and a second cell of a first $1^{st}$-type sensor element of the another first unit block via two parallel main traces, respectively, the two parallel main traces are disposed on the first patterned layer, and the bridge within the first unit block and a bridge within the another first unit block are separated from each other;
   wherein a second unit block of the unit blocks comprises:
      a third $2^{nd}$-type sensor element, belonging to the first $2^{nd}$-type channel, having a main trace and a sub-trace, wherein the main trace of the third $2^{nd}$-type sensor element is connected to the first $2^{nd}$-type sensor element; and
      a fourth $2^{nd}$-type sensor element, belonging to the second $2^{nd}$-type channel, having a main trace and a sub-trace, wherein the main trace of the fourth $2^{nd}$-type sensor element is connected to the second $2^{nd}$-type sensor element.

2. The sensor pattern of claim 1, wherein the second unit block of the unit blocks further comprises:
   a second $1^{st}$-type sensor element, disposed on the first patterned layer, having a border trace, two main traces, a bridge, a first cell, and a second cell, wherein the bridge is utilized for connecting the first cell and the second cell of the second $1^{st}$-type sensor element;

wherein:

the third $2^{nd}$-type sensor element is disposed on the second patterned layer, wherein the main trace of the third $2^{nd}$-type sensor element surrounds the first cell of the first $1^{st}$-type sensor element, and the sub-trace of the third $2^{nd}$-type sensor element is coupled to the first $2^{nd}$-type sensor element of the first unit block; and the fourth $2^{nd}$-type sensor element is disposed on the second patterned layer, wherein the main trace of the fourth $2^{nd}$-type sensor element surrounds the second cell of the second $1^{st}$-type sensor element, and the sub-trace of the fourth $2^{nd}$-type sensor element is coupled to the second $2^{nd}$-type sensor element of the first unit block.

3. The sensor pattern of claim 2, wherein the first cell of the first $1^{st}$-type sensor element and the first cell of the second $1^{st}$-type sensor element are aligned, and the second cell of the first $1^{st}$-type sensor element and the second cell of the second $1^{st}$-type sensor element are aligned.

4. The sensor pattern of claim 1, wherein the second unit block of the unit blocks further comprises:

a second $1^{st}$-type sensor element, disposed on the first patterned layer, having a border trace, two parallel main traces, a bridge, a first cell, and a second cell, wherein the bridge is utilized for connecting the first cell and the second cell of the second $1^{st}$-type sensor element;

wherein:

the third $2^{nd}$-type sensor element is disposed on the second patterned layer, wherein the main trace of the third $2^{nd}$-type sensor element surrounds the second cell of the first $1^{st}$-type sensor element, and the sub-trace of the third $2^{nd}$-type sensor element is coupled to the first $2^{nd}$-type sensor element of the first unit block; and the fourth $2^{nd}$-type sensor element is disposed on the second patterned layer, wherein the main trace of the fourth $2^{nd}$-type sensor element surrounds the first cell of the second $1^{st}$-type sensor element and directly connected to the second $2^{nd}$-type sensor element of the first unit block.

5. The sensor pattern of claim 4, wherein the first cell of the first $1^{st}$-type sensor element and the second cell of the second $1^{st}$-type sensor element are aligned, and the second cell of the first $1^{st}$-type sensor element and the first cell of the second $1^{st}$-type sensor element are aligned.

6. The sensor pattern of claim 1, wherein the first $1^{st}$-type sensor element is a transmit (TX) sensor element, and the first and second $2^{nd}$-type sensor elements are receive (RX) sensor elements.

7. The sensor pattern of claim 6, wherein a TX channel of the sensor pattern comprises a plurality of $1^{st}$-type sensor elements.

8. The sensor pattern of claim 6, wherein an RX channel of the sensor pattern comprises a plurality of $2^{nd}$-type sensor elements.

9. The sensor pattern of claim 1, wherein the first $1^{st}$-type sensor element is an RX sensor element, and the first and second $2^{nd}$-type sensor elements are TX sensor elements.

10. The sensor pattern of claim 9, wherein an RX channel of the sensor pattern comprises a plurality of $1^{st}$-type sensor elements.

11. The sensor pattern of claim 9, wherein a TX channel of the sensor pattern comprises a plurality of $2^{nd}$-type sensor elements.

12. The sensor pattern of claim 1, further comprising:
a shielding layer, disposed between the first $2^{nd}$-type sensor element and the second $2^{nd}$-type sensor element.

13. The sensor pattern of claim 1, further comprising:
a shielding layer, disposed between the unit blocks in different columns.

14. A capacitive touch screen, comprising:
a sensor pattern, comprising:
a plurality of unit blocks, a first unit block of the unit blocks comprising:
a first $1^{st}$-type sensor element, belonging to a first $1^{st}$-type channel, disposed on a first patterned layer, coupled to a border trace, having a bridge, a first cell, and a second cell, wherein the first cell and the second cell are not aligned, wherein the bridge is utilized for connecting the first cell and the second cell of the first $1^{st}$-type sensor element;
a first $2^{nd}$-type sensor element, belonging to a first $2^{nd}$-type channel, disposed on a second patterned layer, having a main trace and a sub-trace, wherein the main trace of the first $2^{nd}$-type sensor element surrounds the first cell of the first $1^{st}$-type sensor element; and
a second $2^{nd}$-type sensor element, belonging to a second $2^{nd}$-type channel different from the first $2^{nd}$-type channel, disposed on the second patterned layer, having a main trace and a sub-trace, wherein the main trace of the second $2^{nd}$-type sensor element surrounds the second cell of the first $1^{st}$-type sensor element;
wherein the unit blocks further comprise another first unit block which has a same architecture as the first unit block, the first cell and the second cell of the first $1^{st}$-type sensor element of the first unit block are connected to a first cell and a second cell of a first $1^{st}$-type sensor element of the another first unit block via two parallel main traces, respectively, the two parallel main traces are disposed on the first patterned layer, and the bridge within the first unit block and a bridge within the another first unit block are separated from each other;
wherein a second unit block of the unit blocks comprises:
a third $2^{nd}$-type sensor element, belonging to the first $2^{nd}$-type channel, having a main trace and a sub-trace, wherein the main trace of the third $2^{nd}$-type sensor element is connected to the first $2^{nd}$-type sensor element; and
a fourth $2^{nd}$-type sensor element, belonging to the second $2^{nd}$-type channel, having a main trace and a sub-trace, wherein the main trace of the fourth $2^{nd}$-type sensor element is connected to the second $2^{nd}$-type sensor element.

15. The capacitive touch screen of claim 14, wherein the second unit block of the unit blocks further comprises:
a second $1^{st}$-type sensor element, having a border trace, two main traces, a bridge, a first cell, and a second cell, wherein the bridge is utilized for connecting the first cell and the second cell of the second $1^{st}$-type sensor element;
wherein:
the main trace of the third $2^{nd}$-type sensor element surrounds the first cell of the first $1^{st}$-type sensor element, and the sub-trace of the third $2^{nd}$-type sensor element is coupled to the first $2^{nd}$-type sensor element of the first unit block; and the main trace of the fourth $2^{nd}$-type sensor element surrounds the second cell of the second $1^{st}$-type sensor element, and the sub-trace of the fourth $2^{nd}$-type sensor element is coupled to the second $2^{nd}$-type sensor element of the first unit block.

16. The capacitive touch screen of claim 15, wherein the first cell of the first $1^{st}$-type sensor element and the first cell of the second $1^{st}$-type sensor element are aligned, and the second cell of the first $1^{st}$-type sensor element and the second cell of the second $1^{st}$-type sensor element are aligned.

17. The capacitive touch screen of claim 14, wherein the second unit block of the unit blocks further comprises:
- a second $1^{st}$-type sensor element, having a border trace, two main traces, a bridge, a first cell, and a second cell, wherein the bridge is utilized for connecting the first cell and the second cell of the second $1^{st}$-type sensor element;

wherein:
- the main trace of the third $2^{nd}$-type sensor element surrounds the second cell of the first $1^{st}$-type sensor element, and the sub-trace of the third $2^{nd}$-type sensor element is coupled to the first $2^{nd}$-type sensor element of the first unit block; and
- the main trace of the fourth $2^{nd}$-type sensor element surrounds the first cell of the second $1^{st}$-type sensor element and directly connected to the second $2^{nd}$-type sensor element of the first unit block.

18. The capacitive touch screen of claim 17, wherein the first cell of the first $1^{st}$-type sensor element and the second cell of the second $1^{st}$-type sensor element are aligned, and the second cell of the first $1^{st}$-type sensor element and the first cell of the second $1^{st}$-type sensor element are aligned.

19. The capacitive touch screen of claim 14, wherein the first $1^{st}$-type sensor element is a transmit (TX) sensor element, and the third and fourth $2^{nd}$-type sensor elements are receive (RX) sensor elements.

20. The capacitive touch screen of claim 14, wherein the first $1^{st}$-type sensor element is an RX sensor element, and the third and fourth $2^{nd}$-type sensor elements are TX sensor elements.

* * * * *